(12) United States Patent
Park et al.

(10) Patent No.: US 11,810,722 B2
(45) Date of Patent: Nov. 7, 2023

(54) MULTILAYER ELECTRONIC COMPONENT WITH DUMMY INTERNAL ELECTRODES

(71) Applicant: SAMSUNG ELECTRO-MECHANICS CO., LTD., Suwon-si (KR)

(72) Inventors: Seung Hyun Park, Suwon-si (KR); Hyung Duk Yun, Suwon-si (KR); Do Young Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 137 days.

(21) Appl. No.: 17/473,402

(22) Filed: Sep. 13, 2021

(65) Prior Publication Data

US 2022/0181087 A1 Jun. 9, 2022

(30) Foreign Application Priority Data

Dec. 9, 2020 (KR) .................. 10-2020-0171347

(51) Int. Cl.
| | |
|---|---|
| *H01G 4/232* | (2006.01) |
| *H01G 4/012* | (2006.01) |
| *H01G 4/30* | (2006.01) |
| *H01G 4/224* | (2006.01) |

(52) U.S. Cl.
CPC .......... *H01G 4/2325* (2013.01); *H01G 4/012* (2013.01); *H01G 4/224* (2013.01); *H01G 4/30* (2013.01)

(58) Field of Classification Search
CPC ...... H01G 4/2325; H01G 4/30; H01G 4/1218; H01G 4/005; H01G 4/002
See application file for complete search history.

(56) References Cited

U.S. PATENT DOCUMENTS

| | | | |
|---|---|---|---|
| 2012/0019981 A1* | 1/2012 | Yoshida | ................ H01F 27/292 361/321.1 |
| 2012/0019982 A1* | 1/2012 | Sasaki | .................... H01G 4/002 361/321.1 |

(Continued)

FOREIGN PATENT DOCUMENTS

| | | | | |
|---|---|---|---|---|
| CN | 110634675 A | * | 12/2019 | ............. H01G 2/065 |
| JP | 2004327983 A | * | 11/2004 | ......... C23C 18/1605 |

(Continued)

*Primary Examiner* — David M Sinclair
*Assistant Examiner* — Daniel M Dubuisson
(74) *Attorney, Agent, or Firm* — Morgan, Lewis & Bockius LLP (57) ABSTRACT

A multilayer electronic component includes a body including an active portion inducing dielectric layers and internal electrodes, and upper and lower cover portions, and external electrodes including connection portions and band portions extending onto portions of first and second surfaces of the body, and including an electrode layer and a conductive resin layer. In a cross-section of the body, when a line along which the band portion of the conductive resin layer is in contact with the first surface is d, an area of an isosceles right triangle, in which d is a base and an extension line extending from an end of the electrode layer by a length of d is a height, is K1, and a ratio of the area occupied by dummy electrodes in the lower cover portion and the internal electrodes in K1 to K1 is K2, K2 is 20% or more.

22 Claims, 6 Drawing Sheets

(56) References Cited

U.S. PATENT DOCUMENTS

| | | | |
|---|---|---|---|
| 2013/0242457 A1* | 9/2013 | Lee | H01G 4/2325 361/301.4 |
| 2013/0250472 A1* | 9/2013 | Lee | H01G 4/012 361/301.4 |
| 2014/0240897 A1* | 8/2014 | Chung | H01G 4/30 361/301.4 |
| 2014/0290998 A1* | 10/2014 | Ahn | H01G 4/248 361/301.4 |
| 2015/0096795 A1* | 4/2015 | Hong | H01G 2/065 361/301.4 |
| 2015/0318110 A1* | 11/2015 | Lee | H01G 4/30 361/301.4 |
| 2016/0099105 A1* | 4/2016 | Lee | H01G 2/065 361/301.4 |
| 2016/0240311 A1* | 8/2016 | Lee | H01G 4/232 |
| 2017/0103853 A1* | 4/2017 | Zenzai | H01G 4/232 |
| 2018/0182551 A1* | 6/2018 | Ahn | H01G 4/12 |
| 2019/0237259 A1* | 8/2019 | Onodera | H01G 4/005 |
| 2020/0111616 A1 | 4/2020 | Choi et al. | |
| 2020/0168400 A1* | 5/2020 | Nakamoto | H01G 4/30 |
| 2021/0327645 A1* | 10/2021 | Takahashi | H01G 4/1209 |

FOREIGN PATENT DOCUMENTS

| | | | | |
|---|---|---|---|---|
| JP | 2018073900 A | * | 5/2018 | H01G 4/008 |
| KR | 2002-033236 A | | 1/2002 | |
| KR | 20140076912 A | * | 6/2014 | |
| KR | 10-2019-0121191 A | | 10/2019 | |
| WO | WO-2009139112 A1 | * | 11/2009 | H01G 4/005 |

\* cited by examiner

MULTILAYER ELECTRONIC COMPONENT WITH DUMMY INTERNAL ELECTRODES

CROSS-REFERENCE TO RELATED APPLICATION(S)

This application claims the benefit of priority to Korean Patent Application No. 10-2020-0171347 filed on Dec. 9, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like, to allow electricity to be charged therein and discharged therefrom.

Such an MLCC having advantages such as compactness, guaranteed high capacitance, and ease in mounting thereof may be used as components of various electronic devices. As various electronic devices such as computers, mobile devices, and the like, have become smaller and higher in terms of power output, demand for miniaturization and higher capacitance of multilayer ceramic capacitors has increased.

In addition, as industry interest in electric parts for automobiles has recently increased, MLCCs are also required to have high reliability and high strength characteristics in order to be used in automobile or infotainment systems.

In particular, multilayer ceramic capacitors disposed in an electronic control unit (ECU) are exposed to external shock, and stress may occur due to thermal shock in a high-temperature and high-humidity environment, resulting in chip failure.

In order to ensure high reliability and high strength characteristics, a method of modifying related art external electrodes configured as electrode layers to a dual-layer structure of an electrode layer and a conductive resin layer has been proposed.

The dual-layer structure of the electrode layer and the conductive resin layer may improve flexural strength characteristics by applying a resin composition containing a conductive material on the electrode layer to absorb external shocks and relieve internal stress and may improve reliability by preventing penetration of a plating solution.

In addition, the flexural strength characteristics are further improved by disposing a cover portion including a dummy electrode on upper and lower surfaces of an active portion.

However, development of an optimized structure is required due to problems such as an increase in a manufacturing process time and costs due to the addition of a dummy electrode.

SUMMARY

Exemplary embodiments provide a multilayer electronic component having improved flexural strength characteristics.

Exemplary embodiments provide a multilayer electronic component having a structure in which defects of a dummy electrode, visible from the outside, are suppressed.

According to an aspect of the present disclosure, a multilayer electronic component includes: a body including an active portion in which dielectric layers and internal electrodes are alternately disposed in a first direction, an upper cover portion disposed on an upper surface of the active portion in the first direction, and a lower cover portion disposed on a lower surface of the active portion in the first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; and external electrodes including connection portions disposed on the third and fourth surfaces and band portions extending from the connection portions onto portions of the first and second surfaces, and including electrode layers disposed on the body and conductive resin layers disposed on the electrode layers. The upper cover portion and the lower cover portion include dummy electrodes. In a cross-section of the body taken in the first and second directions at the center of the body in the third direction, a line along which the band portion of the conductive resin layer is in contact with the first surface is d, an area of an isosceles right triangle, in which d is the base and an extension line extending from an end of the band portion of the electrode layer by a length of d in a direction perpendicular to the first surface is a height, is K1, a ratio of the area occupied by the dummy electrodes and the internal electrodes in K1 to K1 is K2, and K2 is 20% or more.

According to an aspect of the present disclosure, a multilayer electronic component includes: a body including an active portion in which dielectric layers and internal electrodes are alternately disposed in a first direction, an upper cover portion disposed on an upper surface of the active portion in the first direction, and a lower cover portion disposed on a lower surface of the active portion in the first direction, and including first and second surfaces opposing each other in the first direction, and third and fourth surfaces connected to the first and second surfaces and opposing each other in a second direction; a first external electrode including a first connection portion disposed on the third surface and first and second band portions respectively extending from the first connection portion onto portions of the first and second surfaces, and including a first electrode layer disposed on the body and a first conductive resin layer disposed on the first electrode layer; and a second external electrode including a second connection portion disposed on the fourth surface and third and fourth band portions respectively extending from the second connection portion onto portions of the first and second surfaces, and including a second electrode layer disposed on the body and a second conductive resin layer disposed on the second electrode layer. The upper cover portion and the lower cover portion include one or more dummy electrodes. In a cross-section of the body taken in the first and second directions, a line along which the first band portion of the first conductive resin layer is in contact with the first surface is d, an area of an isosceles right triangle, in which d is a base and an extension line extending from an end of the first band portion of the first electrode layer by a length of d in a direction perpendicular to the line is a height, is K1, a ratio of an area, in the isosceles right triangle, starting from an outermost dummy electrode among the one or more dummy electrodes in the lower cover portion to a vertex, spaced apart from the first conductive resin layer, among vertexes of the isosceles right triangle to K1 is K2, and K2 is 20% or more.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or exemplary embodiment, e.g., as to what an example or exemplary embodiment may include or implement, means that at least an example or exemplary embodiment exists in which such a feature is included or implemented while all examples and exemplary embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

In the drawings, a first direction may be defined as a thickness direction or a stacking direction of a body, a second direction may be defined as a length direction of the body, and a third direction may be defined as a width direction of the body.

Multilayer Electronic Component

Figure 1:
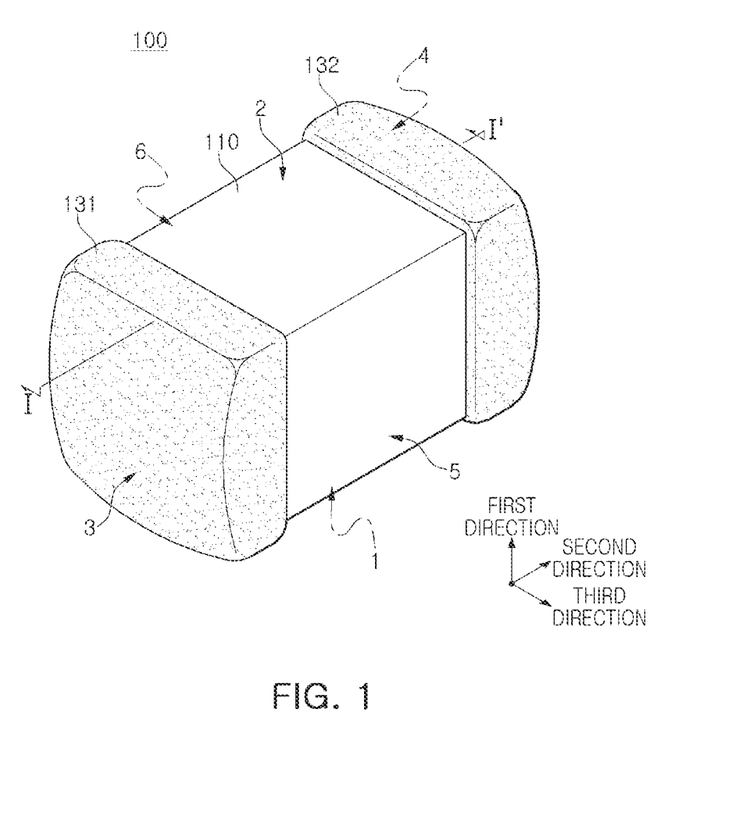
FIG. 1 is a schematic perspective view of a multilayer electronic component according to an exemplary embodiment in the present disclosure.

FIG. 1 is a schematic perspective view of a multilayer electronic component according to an exemplary embodiment in the present disclosure.

Figure 2:
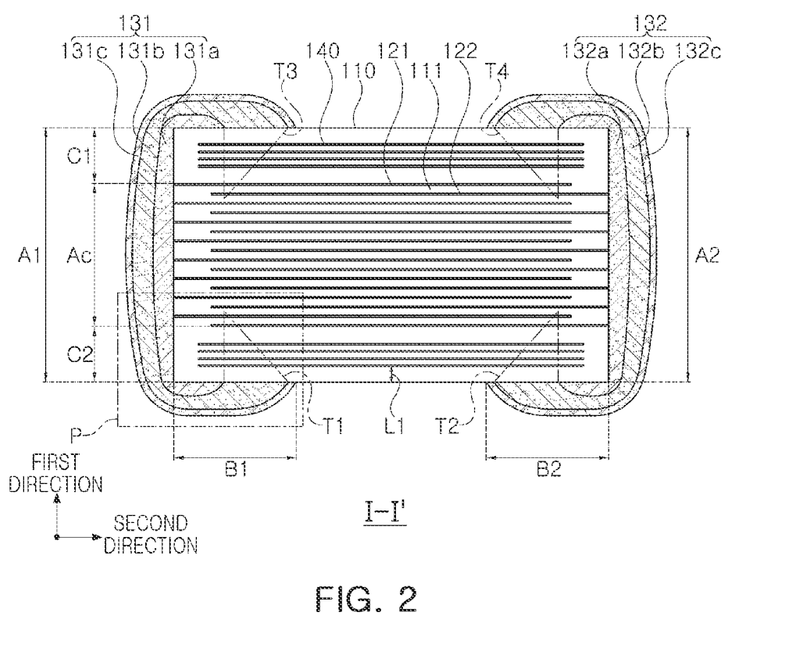
FIG. 2 is a cross-sectional view taken along line I-I' of FIG. 1.

FIG. 2 is a cross-sectional view taken along line I-I' of FIG. 1.

Figure 3:
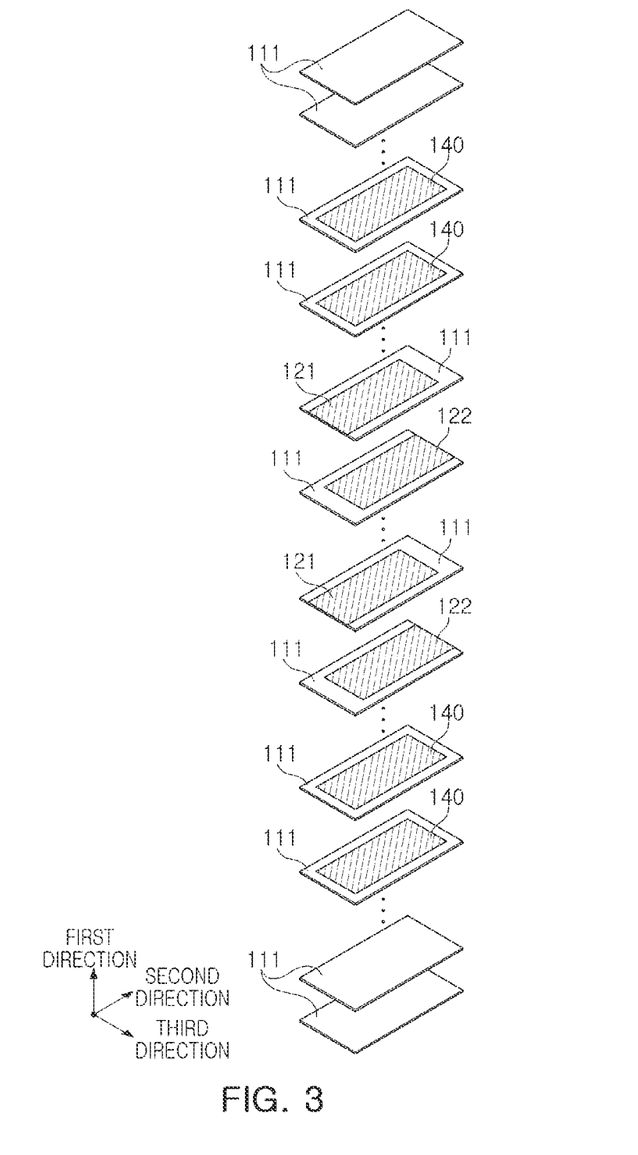
FIG. 3 is an exploded perspective view schematically illustrating a body according to an exemplary embodiment in the present disclosure.

FIG. 3 is an exploded perspective view schematically illustrating a body according to an exemplary embodiment in the present disclosure.

Figure 4:
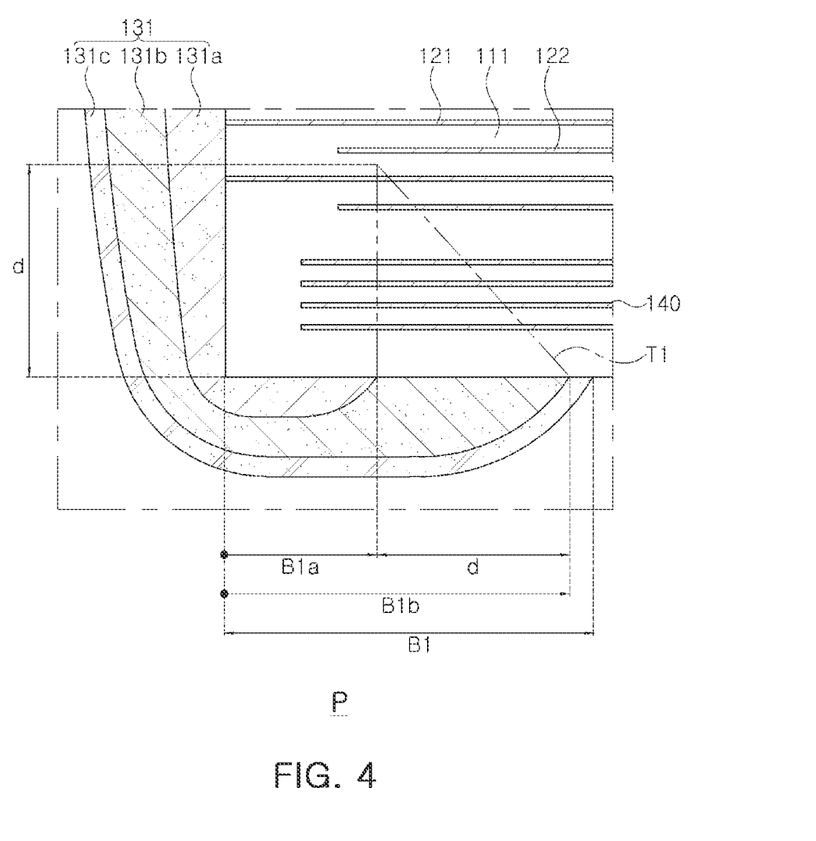
FIG. 4 is an enlarged view of region P of FIG. 2.

FIG. 4 is an enlarged view of region P of FIG. 2.

Hereinafter, a multilayer electronic component 100 according to an exemplary embodiment in the present disclosure will be described with reference to FIGS. 1 through 4.

The multilayer electronic component 100 according to an exemplary embodiment may include: a body including an active portion Ac in which dielectric layers 111 and internal electrodes 121 and 122 are alternately disposed in a first direction, an upper cover portion C1 disposed on an upper surface of the active portion Ac in the first direction, and a lower cover portion C2 disposed on a lower surface of the active portion Ac in the first direction, and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction; and external electrodes 131 and 132 including connection portions A1 and A2 disposed on the third and fourth surfaces and band portions extending from the connection portions A1 and A2 onto portions of the first and second surfaces 1 and 2, and including electrode layers 131a and 132a disposed on the body and conductive resin layers 131b and 132b disposed on the electrode layers 131a and 132a. The upper cover portion C1 and the lower cover portion C2 include dummy electrodes 140, and, in a cross-section of the body taken in the first and second directions at the center of the body in the third direction, when a line along which the band portion of the conductive resin layer 131b or 132b is in contact with the first surface 1 is d, an area of an isosceles right triangle, in which d is the base and an extension line extending from an end of the band portion of the electrode layer 131a or 132a by a length of d in a direction perpendicular to the first surface is a height, is K1, and a ratio of the area occupied by the dummy electrodes and the internal electrodes in K1 is K2, K2 is 20% or more.

In the body 110, the dielectric layer 111 and the internal electrodes 121 and 122 are alternately stacked.

A specific shape of the body 110 is not limited, but, as illustrated, the body 110 may have a hexahedral shape or a similar shape. Due to shrinkage of ceramic powder particle contained in the body 110 during firing, the body 110 may not have a hexahedral shape with perfect straight lines but a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 an 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particle such as barium titanate ($BaTiO_3$) or the like according to purposes of the present disclosure.

The body 110 includes an active portion Ac disposed inside the body 110 and in which the dielectric layers 111 and the internal electrodes 121 and 122 are alternately disposed in the first direction to form capacitance, an upper cover portion C1 disposed above the active portion Ac in the first direction, and a lower cover portion C2 disposed below the active portion Ac in the first direction.

The active portion Ac is a portion that contributes to the formation of capacitance of the capacitor and may be formed by repeatedly stacking a plurality of first and second internal electrodes 121 and 122 with the dielectric layer 111 interposed therebetween.

The internal electrodes 121 and 122 may be disposed to face each other with the dielectric layer 111 interposed therebetween.

The internal electrodes 121 and 122 may include first and second internal electrodes 121 and 122 alternately disposed to face each other with the dielectric layer 111 interposed therebetween.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4. The first external electrode 131 may be disposed on the third surface 3 of the body and connected to the first internal electrode 121 and the second external electrode 132 may be disposed on the fourth surface 4 of the body and connected to the second internal electrode 122.

In other words, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

The first and second internal electrodes 121 and 122 may be electrically separated from each other by the dielectric layer 111 disposed therebetween.

A material forming the internal electrodes 121 and 122 is not limited, and a material having excellent electrical conductivity may be used. For example, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet.

The printing method of the conductive paste for internal electrodes may be a screen printing method or a gravure printing method, but the present disclosure is not limited thereto.

The upper cover portion C1 and the lower cover portion C2 may basically serve to prevent damage to the internal electrodes due to physical or chemical stress.

In addition, the upper cover portion C1 and the lower cover portion C2 may include a dummy electrode 140. The upper cover portion C1 and the lower cover portion C2 may be susceptible to flex cracks due to brittleness of the dielectric material, but bending strength may be improved by disposing the dummy electrode 140 having higher ductility than ceramic.

The upper cover portion C1 and the lower cover portion C2 may be formed by stacking dielectric layers on upper and lower surfaces of the active portion Ac in an up-down direction, respectively, and may be formed by disposing the dummy electrode 140 between the dielectric layers.

The dielectric layers included in the upper cover portion C1 and the lower cover portion C2 may include the same material as the dielectric layer 111 of the active portion Ac.

The material for forming the dummy electrode 140 is not particularly limited, and a material having excellent electrical conductivity may be used. For example, the dummy electrode 140 may be formed by printing a conductive paste including at least one of nickel (Ni), copper (Cu), palladium (Pd), silver (Ag), gold (Au), platinum (Pt), tin (Sn), tungsten (W), titanium (Ti), and alloys thereof on a ceramic green sheet. Further, the dummy electrode 140 may include the same material as the internal electrodes 121 and 122.

Referring to FIG. 3, the body 110 may be formed by alternately stacking the dielectric layer 111 on which the first internal electrode 121 is printed and the dielectric layer 111 on which the second internal electrode 122 is printed in the thickness direction (Z direction), stacking the dielectric layer on which the dummy electrode 140 is printed on the upper and lower portions, and then firing the resultant structure.

The external electrodes 131 and 132 may be disposed on the body 110 and include electrode layers 131a and 132a and conductive resin layers 131b and 132b.

The external electrodes 131 and 132 may include first and second external electrodes 131 and 132 connected to the first and second internal electrodes 121 and 122, respectively.

The first external electrode 131 may include a first electrode layer 131a and a first conductive resin layer 131b, and the second external electrode 132 may include a second electrode layer 132a and a second conductive resin layer 132b.

The first and second electrode layers 131 and 132 may be formed of any material as long as the material has electrical conductivity, such as a metal, and a specific material may be determined in consideration of electrical characteristics and structural stability.

For example, the first and second electrode layers 131 and 132 may include a conductive metal and glass.

A conductive metal used in the electrode layers 131a and 132a is not limited as long as it is a material that may be electrically connected to the internal electrode for forming capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying a conductive paste prepared by adding a glass frit to the conductive metal powder particle and subsequently firing the conductive paste.

In addition, the first and second electrode layers 131a and 132a may also be formed using an atomic layer deposition (ALD) method, a molecular layer deposition (MLD) method, a chemical vapor deposition (CVD) method, a sputtering method, etc.

In addition, the first and second electrode layers 131a and 132a may be formed by transferring a sheet including a conductive metal onto the body 110.

The conductive resin layers 131b and 132b may include a conductive metal and a base resin.

The conductive metal included in the conductive resin layers 131b and 132b serves to electrically connect the conductive resin layers 131b and 132b to the electrode layers 131a and 132a.

The conductive metal included in the conductive resin layers 131b and 132b is not particularly limited as long as it is a material that may be electrically connected to the electrode layers 131a and 132a, and may include at least one selected from the group consisting of, for example, nickel (Ni), copper (Cu), palladium (Pd), silver (Ag), gold (Au), platinum (Pt), tin (Sn), tungsten (W), titanium (Ti), and alloys thereof.

The conductive metal included in the conductive resin layers 131b and 132b may include at least one of a spherical powder particle and a flake powder particle. That is, the conductive metal may be consisted of only the flake powder particle or only the spherical powder particle or may be consisted of a mixture of the flake powder particle and the spherical powder particle.

Here, the spherical powder particle may include a form that is not completely spherical, for example, a form in which a length ratio of a major axis and a minor axis (major axis/minor axis) is 1.45 or less.

The flake powder particle refers to a powder particle having a flat and elongated shape, in which a length ratio of a major axis and a minor axis (major axis/minor axis) may be 1.95 or more, but is not limited thereto.

The lengths of the major axis and the minor axis of the spherical powder particle and the flake powder particle may be measured from an image obtained by scanning the first- and second-directional cross-section taken at a central portion of a multilayer electronic component in the third direction with an SEM.

The base resin included in the conductive resin layers 131b and 132b serve to ensure bondability and absorb shocks.

The base resin included in the conductive resin layers 131b and 132b is not particularly limited as long as it has bondability and shock absorbing properties and may be mixed with conductive metal powder particles to make a paste. For example, the base resin may include at least one of an epoxy-based resin and an acrylic resin.

In addition, the conductive resin layers 131b and 132b may include a conductive metal, an intermetallic compound, and a base resin.

Meanwhile, each of the external electrodes 131 and 132 may further include a plating layer 131c and 132c respectively, disposed on the conductive resin layers 131b and 132b to improve mounting characteristics.

For example, the plating layer 131c and 132c may be a Ni plating layer or a Sn plating layer. The plating layer 131c and 132c may include a Ni plating layer and a Sn plating layer sequentially formed on the conductive resin layers 131b and 132b or may include a plurality of Ni plating layers and/or a plurality of Sn plating layers. In addition, the plating layer 131c and 132c may have a form in which a Ni plating layer and a Pd plating layer are sequentially formed.

The external electrodes 131 and 132 include connection portions A1 and A2 disposed on the third and fourth surfaces of the body 110 and band portions B1 and B2 extending from the connection portions onto the first and second surfaces so as to be disposed.

Referring to FIG. 2, when regions of the first external electrode 131 are distinguished from each other according to positions, the first external electrode 131 may include the first connection portion A1 disposed on the third surface 3 of the body and the first band portion B1 extending from the first connection portion A1 onto portions of the first and second surfaces 1 and 2.

When regions of the second external electrode 132 is distinguished from each other according to positions, the second external electrode 132 may include the second connection portion A2 disposed on the fourth surface 4 of the body and the second band portion B2 extending from the second connection portion A2 onto portions of the first and second surfaces 1 and 2.

Referring to FIGS. 2 and 4, in a cross-section of the body 110 taken in the first and second directions at the center of the body in the third direction, when a line along which the band portion B1 of the conductive resin layer 131b is in contact with the first surface is d, an area of an isosceles right triangle, in which d is the base and an extension line extending from an end of the band portion of the electrode layer 131a by a length of d in a direction perpendicular to the first surface is a height, is K1, and a ratio of the area occupied by the dummy electrodes 140 and the internal electrodes 121 and 122 in K1 is K2, K2 may be 20% or more. In one example, the area occupied by the dummy electrodes 140 and the internal electrodes 121 and 122 to determine K2 may be measured the area occupied by metal included in the dummy electrodes 140 and the internal electrodes 121 and 122 by image-scanning on a cross-section taken in the length-thickness (L-T) direction of the multilayer body 110 through a scanning electron microscope (SEM). In one example, the area occupied by the dummy electrodes 140 and the internal electrodes 121 and 122 to determine K2 may refer to an area, in the isosceles right triangle T1, starting from an outermost dummy electrode 140 to a vertex, spaced apart from the conductive resin layer 131b, among vertexes of the isosceles right triangle T1. In the cross-section of the body 110 taken in the first and second directions at the center of the body in the third direction, the line along which the band portion B1 of the electrode layer 131a is in contact with the first surface is B1a, and the sum of d and B1a is B1b. In one example, an optical microscope or a scanning electron microscope (SEM) may be used in the measurement. Other methods and/or tools appreciated by one of ordinary skill in the art, even if not described in the present disclosure, may also be used. In one example, an isosceles right triangle may refer to a triangle whose base and height are perpendicular to each other and whose base and height have the same length. In another example, an isosceles right triangle may refer to a triangle whose base and height are substantially perpendicular to each other and whose base and height have substantially the same length, in consideration of a measurement or process error/margin recognizable by one of ordinary skill in the art.

Flex cracks generally occur at an end of the band portion, and the crack propagation occurs in a direction of 45 degrees. In order to prevent such flex cracks, a method of modifying the external electrodes including an electrode layer as in the related art into a dual-layer structure of an electrode layer and a conductive resin layer has been proposed.

The dual-layer structure of the electrode layer and the conductive resin layer may improve the flexural strength characteristics by applying a resin composition containing a conductive material to the electrode layer to absorb an external shock to relieve internal stress. In addition, flexural strength characteristics may be further improved by disposing the cover portions including the dummy electrode above and below the active portion.

However, since there are problems such as an increase in manufacturing process time and costs due to the addition of the dummy electrode, the development of an optimized structure is required, and by setting K2 to 20% or more according to an exemplary embodiment in the present disclosure, flexural strength characteristics may be bettered, while the dummy electrode is minimized. In addition, by minimizing the dummy electrode, process manufacturing time and manufacturing costs may be reduced.

If K2 is less than 20%, the effect of suppressing propagation of flex cracks may be insufficient.

K2 may be an average value of values obtained from an isosceles right triangle T1 (and T3) adjacent to the first external electrode 131 and an isosceles right triangle T2 (and T4) adjacent to the second external electrode 132. Since the flex cracks may occur at both ends of the band portions B1 and B2 of the first and second external electrodes, it may be obtained by averaging the K2 values obtained from T1/T3 and T2/T4.

Here, a distance L1 from the first surface of the body 110 to the nearest dummy electrode 140 may be 30 µm or greater.

If L1 is less than 30 µm, the dummy electrode 140 may be visible from the outside of the body 110, resulting in appearance defects.

In addition, in order to control K2 to 20% or more as L1 is 30 µm or more, a length of the line d of the band portion B1 of the conductive resin layer 131b in contact with the first surface of the body 110 may be 43.5 µm or greater.

Meanwhile, if the number of stacked internal electrodes 121 and 122 of the active portion Ac is small and the dummy electrode is not included in the protective part, the flexural strength characteristics may be degraded, and, in particular, the flexural strength characteristics may be degraded if the number of stacked internal electrodes 121 and 122 is equal to or less than 100 layers. However, according to an exemplary embodiment in the present disclosure, if the dummy electrode is included in the protective part and K2 is controlled to 20% or more, sufficient flexural strength characteristics may be ensured even when the number of stacked internal electrodes 121 and 122 is 100 layers or less.

Alternatively, the internal electrodes 121 and 122 may not be included in the isosceles right triangle T1. In other words, even if the internal electrodes 121 and 122 are not included in the right isosceles triangle T1, the flexural strength characteristics may be secured by controlling K2 to 20% or more only by the area occupied by the dummy electrode 140.

In addition, the upper cover portion C1 and the lower cover portion C2 may each include a plurality of dummy electrodes 140.

However, since flexural strength can be secured only if K2 is 20% or more, it is not necessary to specifically limit the number of dummy electrodes 140.

Meanwhile, the internal electrodes 121 and 122 include a first internal electrode 121 having one end exposed to the third surface and a second internal electrode 122 having one end exposed to the fourth surface. The external electrodes 131 and 132 may include a first external electrode 131 disposed on the third surface and connected to the first internal electrode 121 and the second internal electrode 122 disposed on the fourth surface and connected to the second internal electrode 122.

Here, the arrangement of the dummy electrode 140 may not be particularly limited, and the dummy electrode 140 may be disposed to be spaced apart from the first and second external electrodes 131 and 132 as shown in FIG. 2. However, the present disclosure is not limited thereto, and there is no need to specifically limit the arrangement of the dummy electrode 140 if K2 may be secured to 20% or more.

Figure 5:
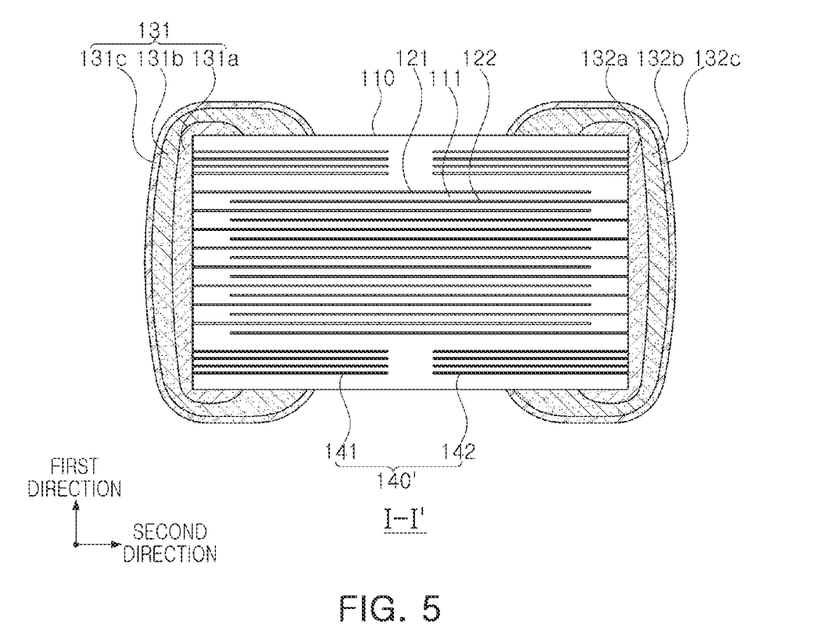
FIG. 5 is a view schematically illustrating a modification of an exemplary embodiment in the present disclosure, corresponding to FIG. 2.

For example, as shown in FIG. 5, a dummy electrode 140' may include a first dummy electrode 141 connected to the first external electrode 131 and a second dummy electrode 142 disposed to be coplanar with the first dummy electrode and spaced apart from the first dummy electrode and connected to the second external electrode.

Figure 6:
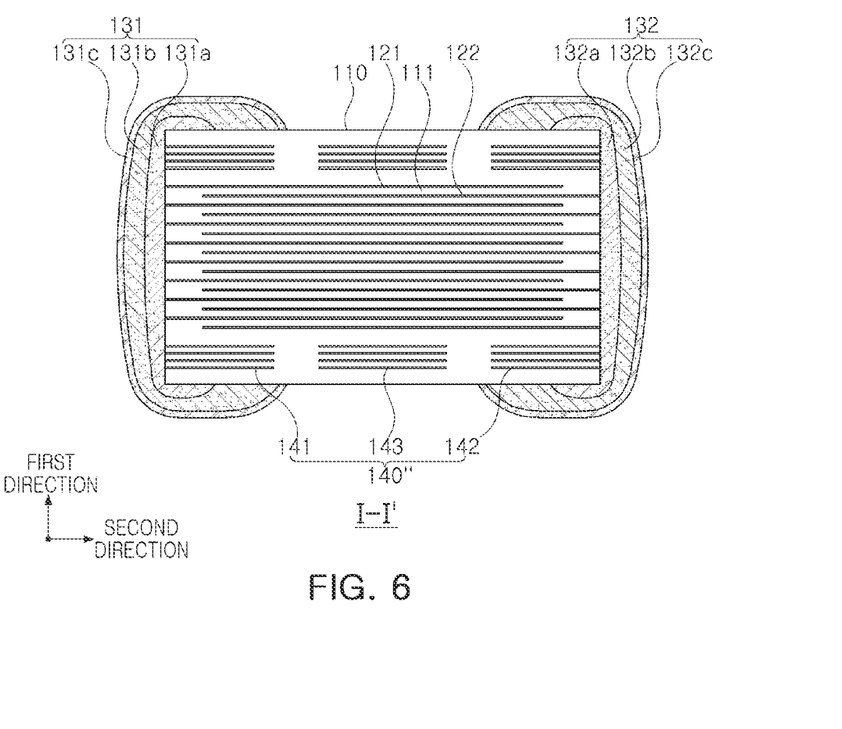
FIG. 6 is a view schematically illustrating another modification of an exemplary embodiment in the present disclosure, corresponding to FIG. 2.

Alternatively, as shown in FIG. 6, a dummy electrode 140" may include a first dummy electrode 141 connected to the first external electrode 131, a second dummy electrode 142 coplanar with the first dummy electrode and spaced apart from the first dummy electrode, and a third dummy electrode 143 disposed between the first dummy electrode 141 and the second dummy electrode 142.

Meanwhile, a thickness of the dielectric layer included in the active portion Ac and a thickness of the dielectric layers included in the upper and lower cover portions C1 and C2 do not need to be the same, and in order to strengthen flexural strength characteristics and easily secure K2 as being 20% or more, the thickness of the dielectric layers included in the upper and lower cover portions C1 and C2 may be thinner than the thickness of the dielectric layer included in the active portion Ac.

Example 1

The chips shown in Table 1 below were prepared, and, in a cross-section of a body taken in the first and second directions at the center of the body in the third direction, when a line along which the band portion of the conductive resin layer is in contact with the first surface is d, an area of an isosceles right triangle, in which d is the base and an extension line extending from an end of the band portion of the electrode layer by a length of d in a direction perpendicular to the first surface is a height d, is K1, and a ratio of the area occupied by the dummy electrodes 140 and the internal electrodes 121 and 122 in K1 was set to K2, and K2 values obtained from the isosceles right triangle T1 adjacent to the first external electrode 131 and from the isosceles right triangle T2 adjacent to the second external electrode 132, and average values thereof are described in Table 1 below.

Flexural strength was evaluated through a bending test.

Figure 7:
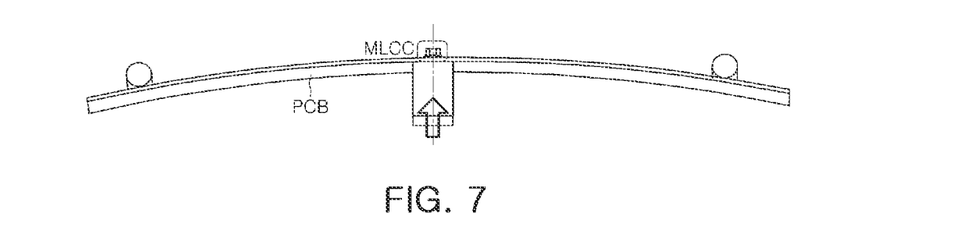
FIG. 7 is a view illustrating a bending test method.

FIG. 7 is a view illustrating a bending test method. Referring to FIG. 7, a sample chip (MLCC) was mounted on a substrate (PCB), and the opposite surface of the sample chip (MLCC) mounting surface was pressed by a maximum of 5 mm, and a case in which flex cracks occurred is marked as X and a case in which flex cracks did not occur is marked as O.

In Table 1 below, W, L, and T refer to width, length, and thickness of the body, respectively.

TABLE 1

|  | Test No. | | | |
| --- | --- | --- | --- | --- |
|  | 1 | 2 | 3 | 4 |
| W (μm) | 2483.37 | 2507.62 | 2537.65 | 2521.95 |
| L (μm) | 3060.41 | 3065.60 | 3054.36 | 3045.69 |
| T (μm) | 2474.80 | 2450.19 | 2514.21 | 2471.05 |
| Thickness of lower cover portion (μm) | 135.72 | 141.14 | 150.41 | 145.92 |

TABLE 1-continued

|  | Test No. | | | |
| --- | --- | --- | --- | --- |
|  | 1 | 2 | 3 | 4 |
| Thickness of dielectric layer of active portion (μm) | 3.88 | 3.70 | 6.74 | 7.20 |
| Thickness of dielectric layer of lower cover portion (μm) | 3.79 | 3.70 | 6.74 | 7.20 |
| Number of stacked internal electrodes | 99 | 115 | 25 | 41 |
| Thickness of internal electrode and dummy electrode (μm) | 1.82 | 1.92 | 1.90 | 1.90 |
| Number of stacked dummy electrodes of lower cover portion | 1 | 1 | 58 | 42 |
| K2 at T1 | 20.08% | 25.71% | 24.31% | 20.85% |
| K2 at T2 | 19.02% | 24.82% | 24.10% | 20.85% |
| Average value of K2 | 19.55% | 25.27% | 24.21% | 20.85% |
| Flexural strength | X | ○ | ○ | ○ |

In the case of Test No. 1, flex cracks occurred with K2 less than 20%. Meanwhile, it can be seen that Test Nos. 2 to 4 having K2 of 20% or more did not have flex cracks and thus exhibit excellent flexural strength characteristics.

Example 2

Flexural strength and whether a dummy electrode was visible were evaluated, while changing the distance L1 from the first surface to the nearest dummy electrode, and results thereof are shown in Table 2.

As for visibility of the dummy electrode, 4000 samples per Test No. were prepared and the first surface of each sample chip was observed using a magnifying glass. A case in which the dummy electrode was visible was determined to be defective, and a case in which a defect rate was 0% was marked as o, a case in which a defect rate was less than 3% was marked as Δ, and a case in which a defect rate was more than 3% was marked as X.

As for flexural strength, 60 samples per Test No. were prepared and evaluated in the same manner as that of Example 1 and the number of defective samples is described.

TABLE 2

| Test No. | L1 (μm) | K2 | Flexural strength | Visibility of dummy electrode |
| --- | --- | --- | --- | --- |
| 5 | 5 | 31.21% | 0/60 | ○ |
| 6 | 10 | 29.95% | 0/60 | ○ |
| 7 | 15 | 28.72% | 0/60 | ○ |
| 8 | 20 | 27.51% | 0/60 | Δ |
| 9 | 25 | 26.33% | 0/60 | Δ |
| 10 | 30 | 25.17% | 0/60 | X |
| 11 | 40 | 22.93% | 0/60 | X |
| 12 | 50 | 20.80% | 0/60 | X |
| 13 | 60 | 18.77% | 1/60 | X |
| 14 | 70 | 16.85% | 2/60 | X |
| 15 | 80 | 15.03% | 5/60 | X |
| 16 | 100 | 11.70% | 9/60 | X |
| 17 | 150 | 5.20% | 37/60 | X |

It can be seen that, in Test Nos. 10 to 17 in which L1 is 30 μm or more, the dummy electrode was not visible, and thus, an appearance defect did not occur.

As set forth above, according to an exemplary embodiment, flexural strength characteristics may be improved by optimizing the arrangement of the dummy electrodes and the internal electrodes.

One of the various effects of the present disclosure is to suppress defects of the dummy electrode visible from the outside.

One of the several effects of the present disclosure is to shorten a process manufacturing time and reduce manufacturing costs.

While example exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a body including an active portion in which dielectric layers and internal electrodes are alternately disposed in a first direction, an upper cover portion disposed on an upper surface of the active portion in the first direction, and a lower cover portion disposed on a lower surface of the active portion in the first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; and
    external electrodes including connection portions disposed on the third and fourth surfaces and band portions extending from the connection portions onto portions of the first and second surfaces, and including electrode layers disposed on the body and conductive resin layers disposed on the electrode layers,
    wherein the upper cover portion and the lower cover portion include dummy electrodes, and, in a cross-section of the body taken in the first and second directions at a center of the body in the third direction, a line along which the band portion of the conductive resin layer is in contact with the first surface is d, an area of an isosceles right triangle, in which d is a base and an extension line extending from an end of the band portion of the electrode layer by a length of d in a direction perpendicular to the first surface is a height, is K1, a ratio of an area occupied by the dummy electrodes and the internal electrodes in K1 to K1 is K2, and K2 is 20% or more.

2. The multilayer electronic component of claim 1, wherein a distance from the first surface to a closest dummy electrode is 30 µm or more.

3. The multilayer electronic component of claim 2, wherein the length of d is 43.5 µm or more.

4. The multilayer electronic component of claim 1, wherein the number of stacked internal electrodes is 100 or less.

5. The multilayer electronic component of claim 1, wherein the internal electrodes are disposed outside the isosceles right triangle.

6. The multilayer electronic component of claim 1, wherein the upper cover portion and the lower cover portion each include a plurality of dummy electrodes.

7. The multilayer electronic component of claim 1, wherein
    the internal electrodes include a first internal electrode and a second internal electrode, and
    the external electrodes include a first external electrode disposed on the third surface and connected to the first internal electrode and a second external electrode disposed on the fourth surface and connected to the second internal electrode.

8. The multilayer electronic component of claim 7, wherein the dummy electrode is disposed to be spaced apart from the first and second external electrodes.

9. The multilayer electronic component of claim 7, wherein the dummy electrodes include a first dummy electrode connected to the first external electrode and a second dummy electrode disposed to be coplanar with the first dummy electrode and disposed to be spaced apart from the first dummy electrode.

10. The multilayer electronic component of claim 9, wherein the dummy electrodes include a third dummy electrode disposed between the first dummy electrode and the second dummy electrode.

11. The multilayer electronic component of claim 9, wherein the second dummy electrode are connected to the second external electrode.

12. The multilayer electronic component of claim 1, wherein a thickness of one of the dielectric layers included in the upper and lower cover portions is smaller than a thickness of one of the dielectric layers included in the active portion.

13. A multilayer electronic component comprising:
    a body including an active portion in which dielectric layers and internal electrodes are alternately disposed in a first direction, an upper cover portion disposed on an upper surface of the active portion in the first direction, and a lower cover portion disposed on a lower surface of the active portion in the first direction, and including first and second surfaces opposing each other in the first direction, and third and fourth surfaces connected to the first and second surfaces and opposing each other in a second direction;
    a first external electrode including a first connection portion disposed on the third surface and first and second band portions respectively extending from the first connection portion onto portions of the first and second surfaces, and including a first electrode layer disposed on the body and a first conductive resin layer disposed on the first electrode layer; and
    a second external electrode including a second connection portion disposed on the fourth surface and third and fourth band portions respectively extending from the second connection portion onto portions of the first and second surfaces, and including a second electrode layer disposed on the body and a second conductive resin layer disposed on the second electrode layer,
    wherein the upper cover portion and the lower cover portion include one or more dummy electrodes, and
    in a cross-section of the body taken in the first and second directions, a line along which the first band portion of the first conductive resin layer is in contact with the first surface is d, an area of an isosceles right triangle, in which d is a base and an extension line extending from an end of the first band portion of the first electrode layer by a length of d in a direction perpendicular to the line is a height, is K1, a ratio of an area, in the isosceles right triangle, starting from an outermost dummy electrode among the one or more dummy electrodes in the lower cover portion to a vertex, spaced apart from the first conductive resin layer, among vertexes of the isosceles right triangle to K1 is K2, and K2 is 20% or more.

14. The multilayer electronic component of claim 13, wherein the cross-section of the body is a cross-section taken in the first and second directions at a center of the body in the third direction.

15. The multilayer electronic component of claim 13, wherein a distance from the line to the outermost dummy electrode is 30 µm or more.

16. The multilayer electronic component of claim 13, wherein the length of d is 43.5 μm or more.

17. The multilayer electronic component of claim 13, wherein the number of stacked internal electrodes is 100 or less.

18. The multilayer electronic component of claim 13, wherein the internal electrodes are disposed outside the isosceles right triangle.

19. The multilayer electronic component of claim 13, wherein a thickness of one of the dielectric layers included in the upper and lower cover portions is smaller than a thickness of one of the dielectric layers included in the active portion.

20. The multilayer electronic component of claim 13, wherein the outermost dummy electrode is in contact with the height of the isosceles right triangle.

21. The multilayer electronic component of claim 13, wherein the internal electrodes include one internal electrode connected to the second external electrode and including a portion disposed in the isosceles right triangle.

22. The multilayer electronic component of claim 13, wherein the internal electrodes include one internal electrode connected to the second external electrode and being in contact with the height of the isosceles right triangle.

* * * * *